Patented July 8, 1930

1,770,281

UNITED STATES PATENT OFFICE

ROBERT W. OSTERMAYER, OF PITTSBURGH, PENNSYLVANIA, ASSIGNOR TO NEVILLE CHEMICAL COMPANY, A CORPORATION OF PENNSYLVANIA

METHOD OF PREPARING COUMARONE-INDENE RESINS

No Drawing. Application filed June 20, 1929. Serial No. 372,542.

This invention relates to the derivation of a resin from coal tar distillates, and constitutes more specifically an improvement on a method of preparing coumarone resins as described and claimed in Patent No. 1,705,857, issued March 19, 1929 to Ralph L. Emery.

In the patent above noted crude solvent naphtha No. 2, having a coumarone and indene component up to 80 per cent of the whole is polymerized, and is then diluted with the petroleum benzine to precipitate undesired substances, which separate by gravity from the liquid containing the desired products.

By "coumarone-indene", as used throughout the specification and claims, I mean components and resins consisting chiefly of these substances, but which frequently include lesser quantities of other resinous substances. Among the members of such other resinous substances which have been isolated are the following, constituting a partial list only:

Coumarone $(C_6H_4)(C_2H_2O)$.
Indene $(C_6H_4)(C_3H_4)$.
Methyl coumarone
  $(C_6H_3)(C_2H_2O)(CH_3)$.
Dimethyl coumarone
  $(C_6H_2)(C_2H_2O)(CH_3)_2$.
Trimethyl coumarone
  $(C_6H)(C_2H_2O)(CH_3)_3$.
Hydrindene $(C_6H_4)(C_3H_6)$.
Dicyclopentadiene $(C_5H_6)_2$.
Styrolene $(C_6H_5)(CH:CH_2)$.

I have found that the diluent may be advantageously added before polymerization, and that I may dilute the naphtha with cuts of petroleum distillate other than petroleum benzine. By diluting at an early stage I am able to control better the rate and completion of the polymerizing reaction than when the diluent is added after polymerization. I have further discovered that by adding the diluent before polymerization of the coumarone-indene components of the solvent naphtha I am able to secure satisfactory results when the indene and coumarone are contained in a measure which amounts to a greater percentage of the whole.

According to my preferred method of procedure crude solvent naphtha is prepared for distillation in the usual manner. It may then be distilled, and several cuts taken, which vary from those containing a relatively small percentage of the coumarone-indene components to the resin oils containing a relatively great percentage, as high as 90 per cent, or more, of these components. A mixture of low melting point resins is left as a still residue. I may then commingle the cuts, or proceed with them separately.

To either the separate cuts, or to the refined naphtha without any fractionation, I then add a petroleum distillate. In all petroleum distillates the undesired products of coumarone-indene polymerization are insoluble, so that any cut which fulfills the other conditions of the process may be added. The liquid comprising the diluted naphtha is then subjected to the action of a suitable polymerizing agent, such as sulphuric acid, anhydrous stannic tetrachloride, or anhydrous phosphoric acid. As polymerization proceeds the undesired products are precipitated in the diluted liquid, leaving a relatively light liquid containing as components the desired coumarone-indene resins. This liquid remains light because a heavy syrupy product is not permitted to form, as when the diluent is not added until polymerization has been completed.

According to previous procedure, the liquid is then decanted from the precipitate and washed free of the polymerizing agent and remaining impurities. It is then distilled, the distillation being desirably under a high vacuum in order to remove the solvents more rapidly than is possible under a low vacuum or at atmospheric pressure. The resinous material in the still is then steamed for the removal of heavy oils, and the remaining resinous residue constitutes the desired resins, free both of the undesired products of polymerization and free also of any undesired unpolymerized oil with which the resin may up to that point have been associated. In general, I have found, that by polymerizing the coumarone-indene components of the solvent naphtha in dilution with the petroleum distillate, the reaction may be carried substantially to completion. The pure resin residue is drawn off, and cooled.

I have found also that the diluent may be satisfactorily added after polymerization has begun but before completion thereof. In this variation of my process the polymerizing agent is added and polymerization proceeds until the reaction slows down by the formation of viscous products which tend to prevent intimate contact between the polymerizing agent and the yet unpolymerized components. The petroleum distillate is then added in the continued presence of the active polymerizing agent, and the reaction carried to substantial completion, with precipitation of the products which are insoluble in the diluent.

I have found that with either various separate naphtha cuts or the commingled resin oils, I may utilize petroleum distillates lying within a relatively wide gravity range, for example I have used those lying between 30 Baumé and 70 or more Baumé. This includes the petroleum distillate cuts known commercially as wash oil, kerosene, petroleum benzine, and gasoline. In general I have found the lighter end more efficient.

The lighter distillate is preferred, as this creates the least tendency to emulsification during the washing of the liquid after polymerization and before distillation. Even with wash oil and kerosene the emulsifying tendency is much less than is experienced by the use of a coal tar distillate, such as toluol or benzol.

I have further discovered that cuts of refined naphtha containing percentages of coumarone-indene components higher than 80 per cent, in addition to those containing a lower percentage, may be satisfactorily treated by dilution with the petroleum distillates prior to the completion of polymerization. When, according to my procedure, the petroleum distillate diluent is added prior to the completion of polymerization, satisfactory results may be secured even though the naphtha cut contains a relatively high percentage of the coumarone-indene components.

What I claim is:

1. The method herein described of deriving resin from coal tar distillate which comprises preparing a distillate having a coumarone-indene content, polymerizing the coal tar distillate in the presence of a petroleum distillate diluent with the production of precipitates insoluble in the diluent, removing such precipitates, and separating the dissolved resin.

2. The method herein described of deriving resin from coal tar distillate which comprises preparing a distillate having a coumarone-indene content amounting to more than 80% of the whole, polymerizing the coal tar distillate in the presence of a petroleum distillate diluent with the production of precipitates insoluble in the diluent, removing such precipitates, and separating the dissolved resin.

3. The method herein described of deriving resin from coal tar distillate which comprises preparing a distillate having a coumarone-indene content, adding a polymerizing agent to the coal tar distillate, diluting the distillate and products of polymerization with a petroleum distillate during the progress of the polymerizing step, continuing the polymerization to substantial completion with precipitation of products insoluble in the diluent, removing such precipitates, and separating the dissolved resin.

4. The method herein described of deriving resin from coal tar distillate which comprises preparing a distillate having a coumarone-indene content amounting to more than 80% of the whole, adding a polymerizing agent to the coal tar distillate diluting the distillate and products of polymerization with a petroleum distillate during the progress of the polymerizing step, continuing the polymerization to substantial completion with precipitation of products insoluble in the diluent, removing such precipitates, and separating the dissolved resin.

In testimony whereof I have hereunto set my hand.

ROBERT W. OSTERMAYER.